United States Patent
Ishii

(10) Patent No.: US 9,116,651 B2
(45) Date of Patent: Aug. 25, 2015

(54) IMAGE PROCESSING APPARATUS, CONTROL METHOD, AND RECORDING MEDIUM STORING COMPUTER PROGRAM FOR IMAGE PROCESSING

(75) Inventor: Yoko Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/154,311

(22) Filed: Jun. 6, 2011

(65) Prior Publication Data

US 2011/0302512 A1    Dec. 8, 2011

(30) Foreign Application Priority Data

Jun. 8, 2010    (JP) .................................. 2010-131256

(51) Int. Cl.
*G06F 3/048*    (2013.01)
*G06F 3/12*    (2006.01)
*G06F 9/44*    (2006.01)

(52) U.S. Cl.
CPC ............ *G06F 3/1285* (2013.01); *G06F 3/1207* (2013.01); *G06F 3/1259* (2013.01); *G06F 9/4448* (2013.01)

(58) Field of Classification Search
None
See application file for complete search history.

(56) References Cited

U.S. PATENT DOCUMENTS

| | | | |
|---|---|---|---|
| 7,363,586 B1 * | 4/2008 | Briggs et al. .................. | 715/736 |
| 7,458,023 B2 * | 11/2008 | Kurumatani .................. | 715/242 |
| 7,849,094 B2 * | 12/2010 | Arai .............................. | 707/756 |
| 2003/0115552 A1 | 6/2003 | Jahnke | |
| 2004/0085570 A1 * | 5/2004 | Sfaelos et al. ............... | 358/1.15 |
| 2004/0210841 A1 * | 10/2004 | Takahashi ..................... | 715/536 |
| 2006/0077439 A1 * | 4/2006 | Yamamura et al. .......... | 358/1.15 |
| 2006/0077440 A1 * | 4/2006 | Stevens et al. ............... | 358/1.15 |
| 2008/0222213 A1 | 9/2008 | Arai | |
| 2008/0244397 A1 | 10/2008 | Ferlitsch | |
| 2008/0252919 A1 * | 10/2008 | Okayama et al. ............ | 358/1.15 |
| 2009/0066710 A1 * | 3/2009 | Pathak .......................... | 345/581 |

FOREIGN PATENT DOCUMENTS

| | | |
|---|---|---|
| JP | 2002-007095 A | 1/2002 |
| JP | 2002-324017 A | 11/2002 |
| JP | 2004-213462 A | 7/2004 |
| JP | 2004-227199 A | 8/2004 |
| JP | 2005-100319 A | 4/2005 |
| JP | 2009-075677 A | 4/2009 |

* cited by examiner

*Primary Examiner* — William Bashore
*Assistant Examiner* — Hien Duong
(74) *Attorney, Agent, or Firm* — Canon USA Inc IP Division

(57) ABSTRACT

An information transmission apparatus receives information indicating a display language type of a web page to be displayed on a web browser included in an information processing apparatus, and determines whether a display language type of a screen displayed on a display unit included in the information transmission apparatus matches the display language type indicated by the received information. If the display languages do not match, the information transmission apparatus changes the display language of the screen displayed on the display unit to the display language indicated by the received information, generates a web page including image data indicating a screen of a changed display language type, and transmits the generated web page to the information processing apparatus.

7 Claims, 7 Drawing Sheets

IMAGE PROCESSING APPARATUS, CONTROL METHOD, AND RECORDING MEDIUM STORING COMPUTER PROGRAM FOR IMAGE PROCESSING

BACKGROUND OF THE INVENTION

1. Field of the Invention

The present invention relates to an information transmission apparatus that transmits information about the apparatus to an external device, a control method thereof, and a recording medium that stores a computer program.

2. Description of the Related Art

Conventionally, there is an image processing apparatus that includes a web server function. Such an image processing apparatus generates as a web page, information about a job status of the image processing apparatus and image data stored in a storing device included in the image processing apparatus. The image processing apparatus then transmits the generated web page to a client personal computer (PC) connected via a network, so that the information can be browsed on a web browser in the client PC (for example, refer to Japanese Patent Application Laid-Open No. 2002-007095). Hereinafter, such a web page will be referred to as a remote user interface (UI). If a user browses the remote UI, the user can acquire information about the job executed by the image processing apparatus, the information about the image data, or the status of the apparatus, even when located away from the image processing apparatus.

In the case of the conventional remote UI, the web server in the apparatus which provides the remote UI generates a dedicated page for the remote UI, so that various types of information such as the status of the job or the apparatus are notified to the client PC. In other words, a screen which is in common with the screen displayed on a display unit in an operation panel attached to the image processing apparatus (hereinafter referred to as a local UI) is not generated in the conventional remote UI.

In contrast, if the screen displayed on the local UI is simply captured, and the captured screen is displayed on the remote UI, the following problem occurs. A display language of the local UI is set to the apparatus itself. On the other hand, the display language of the remote UI is set according to a request from the browser every time there is access. In other words, each of the display languages is independently set. As a result, the display language types of the display screens of the local UI and the remote UI may become different. For example, the local UI may be set to be displayed in Japanese, and the remote UI may be set to be displayed in English. In such a case, it may be difficult for the user to understand the captured screen of the local UI displayed on the remote UI.

SUMMARY OF THE INVENTION

The present invention is directed to providing an apparatus and a control method for solving the above-described problems.

According to an aspect of the present invention, an information transmission apparatus includes a receiving unit configured to received from an information processing apparatus, information indicating a display language type of a web page to be displayed on a web browser included in the information processing apparatus, a first determination unit configured to determine whether a display language type of a screen displayed on a display unit included in an information transmission apparatus matches a display language type indicated by information received by the receiving unit, a changing unit configured to change, if a display language type of a screen displayed on the display unit does not match a display language type indicated by information received by the receiving unit, a display language type of a screen displayed on the display unit to a display language type indicated by the received information, a generation unit configured to generate a web page including image data indicating a screen that is in common with a screen displayed on a display unit included in the information transmission apparatus and indicating a screen of a display language type changed by the changing unit, and a transmission unit configured to transmit to the information processing apparatus a web page generated by the generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
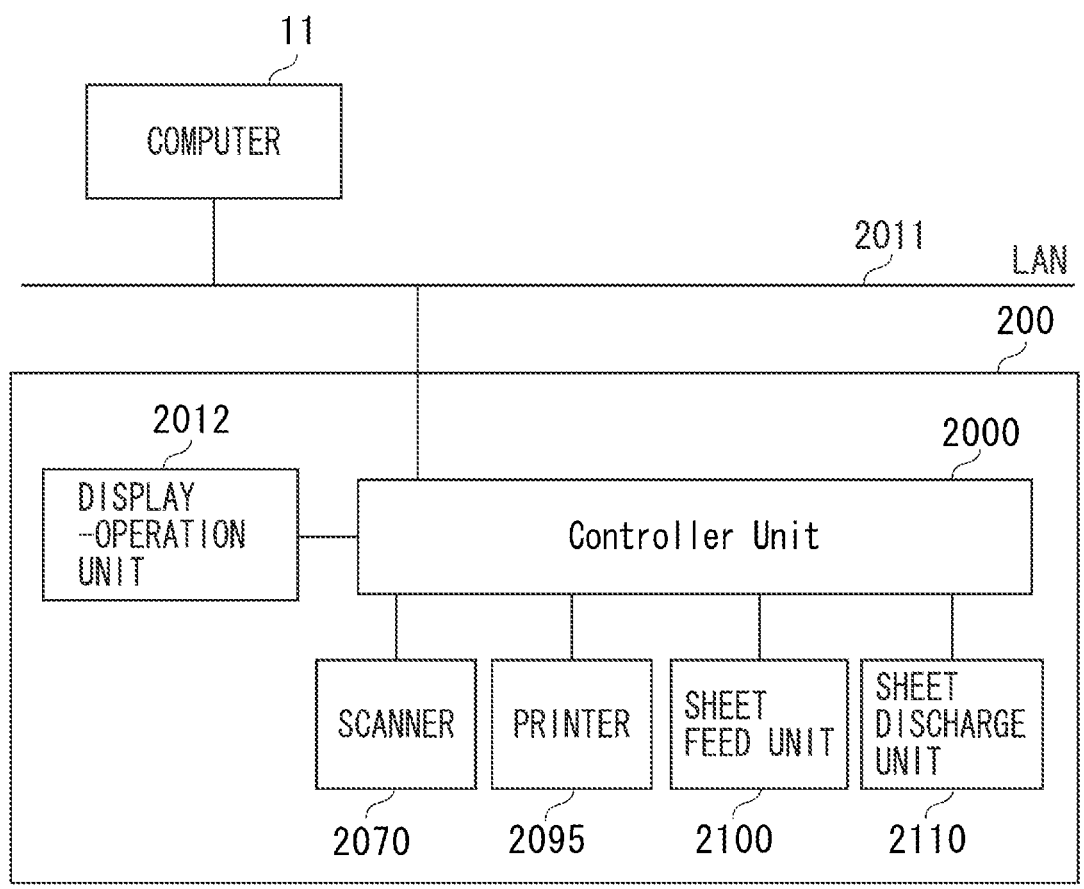
FIG. 1 illustrates a system configuration according to an exemplary embodiment of the present invention.

FIG. 1 illustrates a system configuration according to a first exemplary embodiment of the present invention.

Referring to FIG. 1, an image processing apparatus 200 includes a scanner unit 2070, a printer unit 2095, a controller unit 2000, and a display-operation unit 2012, i.e., a local UI.

The scanner unit 2070, the printer unit 2095, a sheet feed unit 2100, a sheet discharge unit 2110, and the display-operation unit 2012 are each connected to the controller unit 2000. The controller unit 2000 is connected to a network transmission means such as a local area network (LAN) 2011.

The controller unit 2000 is connected to the scanner unit 2070, i.e., an image input device, and the printer unit 2095, i.e., an image output device. Further, the controller unit 2000 is connected to the sheet feed unit 2100 that feeds sheets, and the sheet discharge unit 2110 that discharges printed sheets. The sheet feed unit 2100 includes a plurality of sheet feed stages and an inserter (not illustrated). Further, the sheet discharge unit 2110 includes optional parts such as a finisher including a plurality of sheet discharge bins and a finisher including a book-binding function (not illustrated).

The display-operation unit 2012, i.e., the local UI, includes as an operation interface for the user, a display unit for displaying the status of the apparatus main body and job information. The display unit includes a touch panel function, light emitting diode (LED) that indicates a status of the image processing apparatus, and hard key buttons. The user is thus able to be notified of an error status of the image processing apparatus from the information displayed on the display-operation unit 2012. Further, the user can operate the image processing apparatus by pressing an operation menu button displayed on the display-operation unit 2012 using the touch panel and the hard key buttons. According to the present exemplary embodiment, the image processing apparatus 200 operates as the information transmission apparatus that transmits to the client PC, requested information according to the request from the client PC. It is only necessary for the information transmission apparatus to include a function for transmitting the requested information. The information transmission apparatus is thus not limited to the image processing apparatus such as a printer, a scanner, a copying machine, or a facsimile, and may include other apparatuses.

A computer 11 includes a display device, a keyboard, a pointing device, and a computer main body (not illustrated). Further, the computer 11 includes a function for loading to a random access memory (RAM), an operating system (OS) from a storage device included in the computer main body, and executing various application programs. Furthermore, the computer 11 can communicate with the image processing apparatus 200 via the network using a network interface (not illustrated), and can display on the display device, information acquired by communicating therewith. Moreover, a web browser is stored in the storage device to be executable in the computer 11. The computer 11 can thus use the web browser and a predetermined protocol to communicate with the image processing apparatus that can operate as the web server to be described below, and display the remote UI on the display device. The computer 11 operates as the information processing apparatus, i.e., the client PC, that requests the information transmission apparatus for information and displays the acquired information. According to the present exemplary embodiment, the computer 11 is described as an example of the information processing apparatus. However, the information processing apparatus may be other apparatuses, such as a cellular phone.

Referring to FIG. 1, the image processing apparatus 200 and the computer 11 are connected to be communicable with each other via the LAN 2011. In such a system, if there is an information acquisition request from the web browser included in the computer 11 to the image processing apparatus 200, the image processing apparatus 200 transmits the requested information to the computer 11. The connection between the image processing apparatus 200 and the computer 11 is not limited to the LAN and may be realized by other connection methods such as the Internet and wireless communication. Further, only the computer 11 and the image processing apparatus 200 are connected to the LAN 2011 in the example illustrated in FIG. 1. However, other apparatuses may be connected to the LAN 2011.

Figure 2:
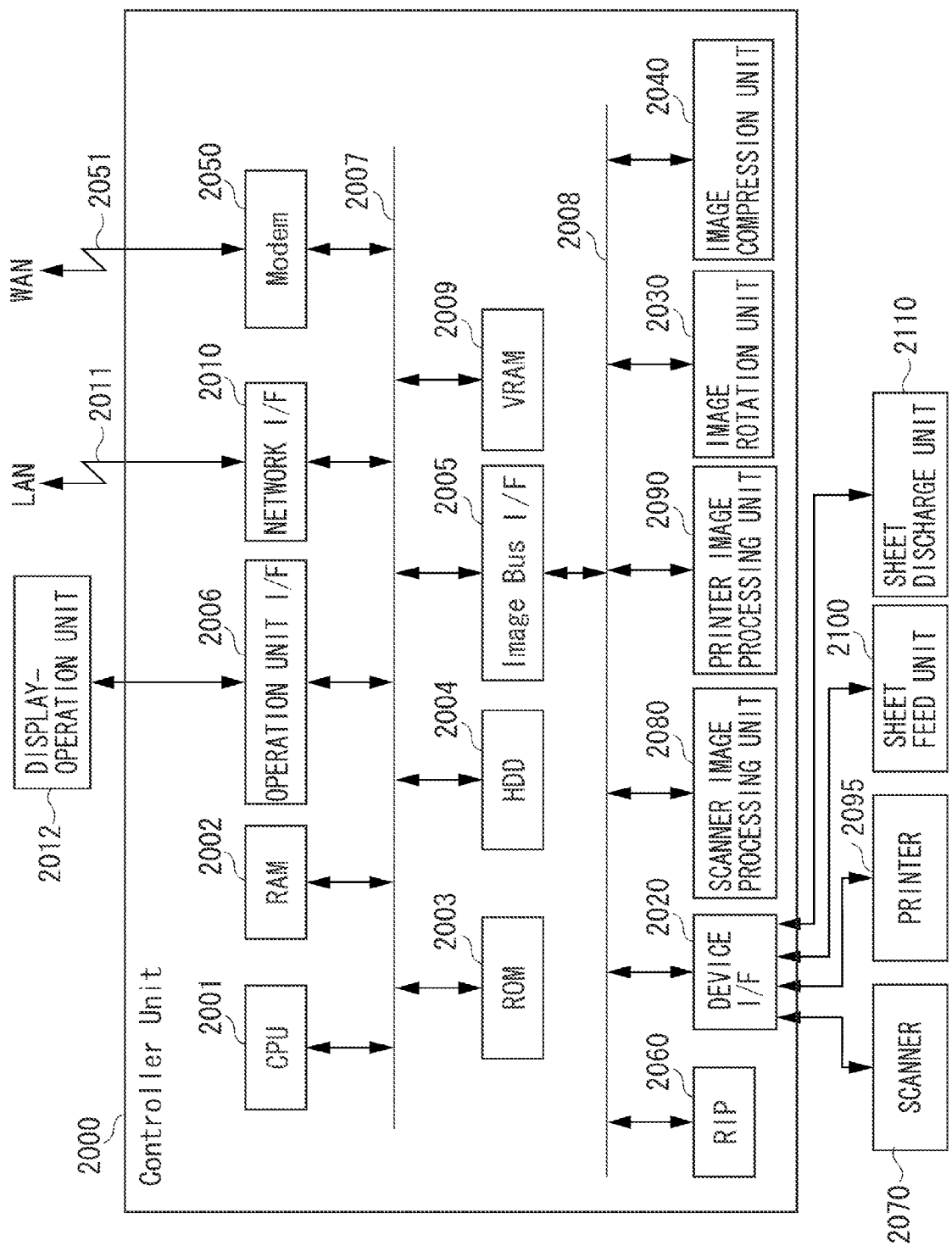
FIG. 2 is a block diagram illustrating a configuration of a control unit in an image processing apparatus according to an exemplary embodiment of the present invention.

FIG. 2 is a block diagram illustrating in detail a hardware configuration of the controller unit 2000 illustrated in FIG. 1. Components that are similar to those illustrated in FIG. 1 are assigned the same reference numerals.

Referring to FIG. 2, a central processing unit (CPU) 2001 is a controller that controls the entire system. The CPU 2001 collectively controls access to various devices connected to a system bus 2007, based on control programs stored in a program read-only memory (ROM) 2003 and a hard disk drive (HDD) 2004. Further, the CPU 2001 issues instructions to the various devices, so that printing is performed and display image data to be displayed on the display-operation unit 2012 is generated. Furthermore, the CPU 2001 generates the web page to be displayed on the remote UI, based on the CGI program to be described below. Moreover, the CPU 2001 reads input information from the scanner 2070 connected via a device interface 2020. Further, the CPU 2001 outputs an image signal as output information to the printer 2095 connected via the device interface 2020.

Figure 6:
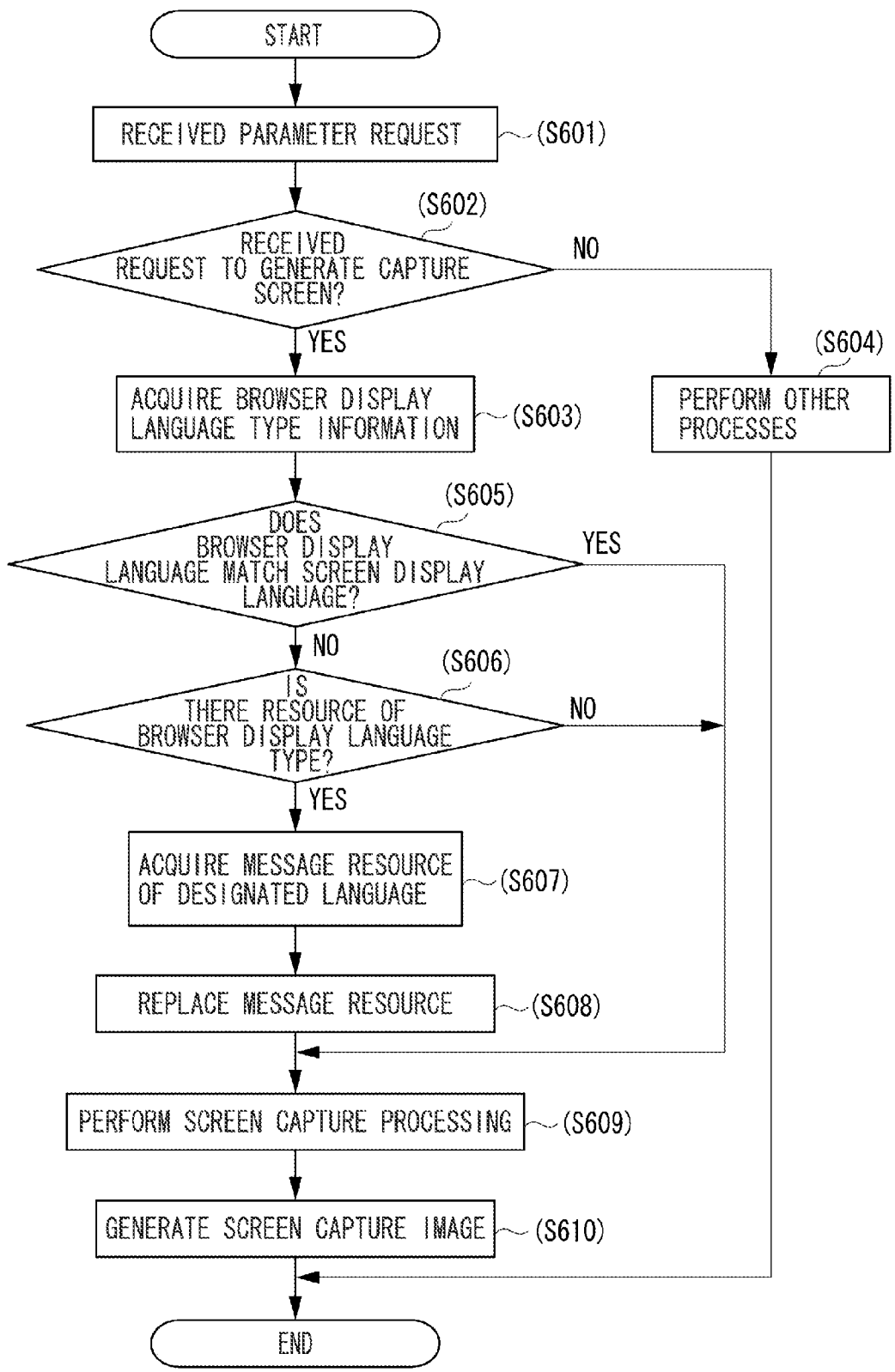
FIG. 6 is a flowchart illustrating a processing procedure of a common gateway interface (CGI) program performed in step S509 illustrated in FIG. 5.

The ROM 2003 stores the control program, the software modules, and the CGI program corresponding to a process illustrated in the flowchart of FIG. 6. The CPU 2001 performs processing and calculations of the various types of information, controls the various devices, and generates the web page to be displayed on the remote UI, based on the CGI program. Further, the ROM 2003 stores a boot program of the system and functions as a boot ROM.

The RAM 2002 is a system work memory for the CPU 2001 to operate. The RAM 2002 temporarily stores the image data and a screen information table to be described below.

The HDD 2004 stores the system software, and resources for displaying the display-operation unit 2012, i.e., the image data and message data. Further, the HDD 2004 stores a resource file and a template file to be used in generating the web page.

The storage device in the image processing apparatus, such as the HDD 2004, stores the screen information table that defines screen information. An example of the screen information table will be described below with reference to FIG. 3. The screen information table is expanded in the RAM 2002 by performing each of the steps illustrated in FIG. 6 or as necessary, so that the CPU 2001 can refer to the screen information table.

Figure 3:
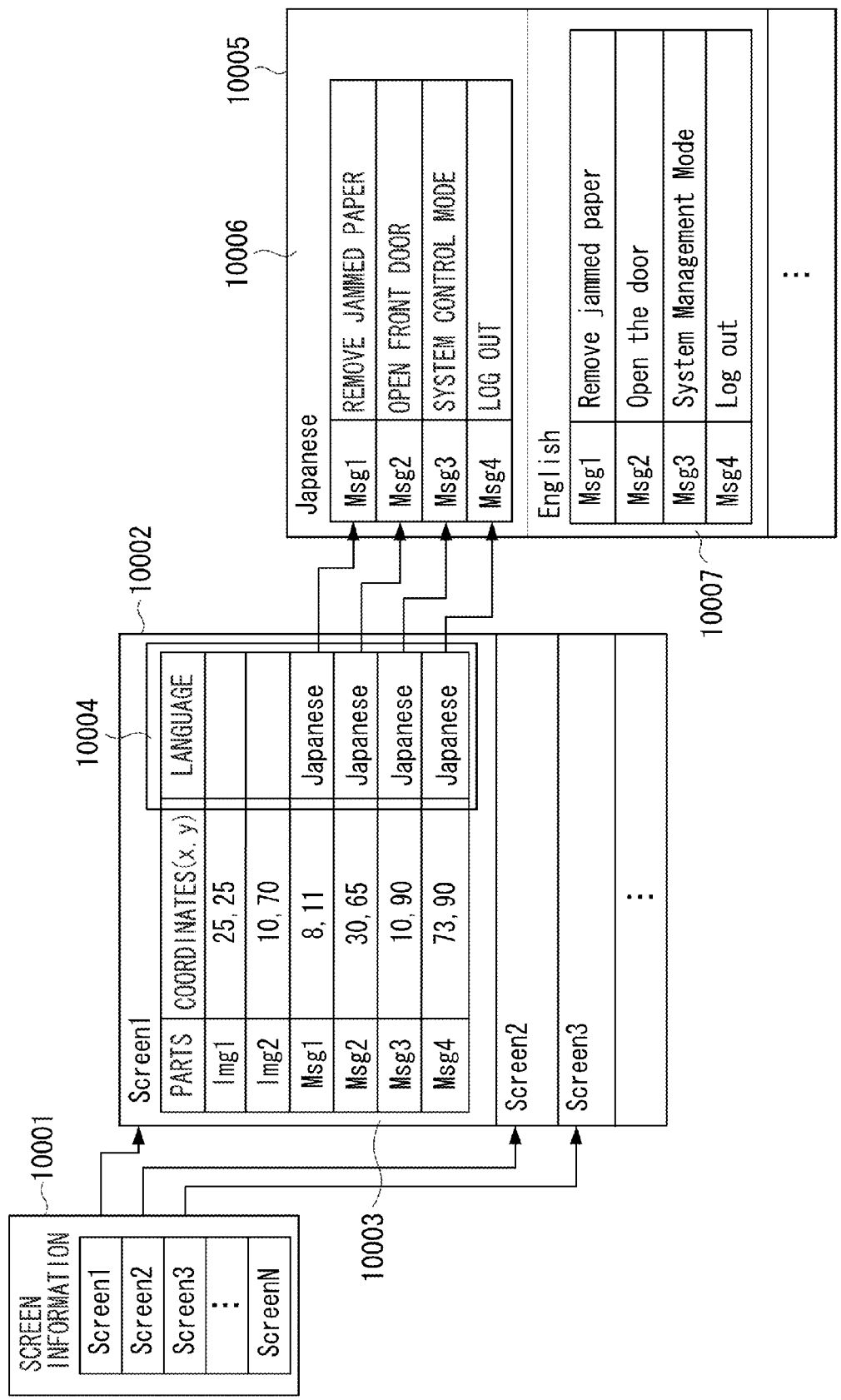
FIG. 3 illustrates an example of a screen information table stored in the image processing apparatus according to an exemplary embodiment of the present invention.

Referring to FIG. 3, screen information 10002 corresponding to the number of screens displayed on the operation unit 2012 in the image processing apparatus is stored inside image information 10001. Each screen is configured by parts including the images and the messages that form one screen, coordinates information, and language type information 10004. The language designated in the language type information 10004 is referred to in the message resources of each of the languages stored in a message resource storing unit 10005. In the example illustrated in FIG. 3, since the language type information 10004 of a screen 1 10003 refers to a Japanese message resource 10006 in the message resource storing unit 10005, the screen 1 is displayed in Japanese. If the language of the screen 1 is to be changed to English, the language type information 10004 refers to an English message resource 10007 in the message resource 10005.

As described above, the display language type of the screen to be displayed on the display-operation unit 2012 can be defined using the screen information table. According to the present exemplary embodiment, the language type can be set to each message in the screen. However, a configuration in which only a uniform language type can be set to the entire operation screen may be adopted.

Referring to FIG. 2, an operation unit interface (I/F) 2006 functions as an interface to the display-operation unit 2012. The operation unit I/F 206 transmits to the CPU 2001, information that the user has input to the system using the menu button displayed on the touch panel and the hard keys included in the display-operation unit 2012.

Further, the operation unit I/F 2006 receives the user input from the hard keys and the touch panel included in the display-operation unit 2012, and acquires the operation content.

The CPU 2001 generates the display screen data of the screen to be displayed on the display-operation unit 2012, based on the operation content acquired from the operation unit I/F 2006 and the above-described control program. The CPU 2001 then stores the display screen data in a video (V) RAM 2009. The display screen data stored in the VRAM 2009 is output as the display screen to the display-operation unit 2012 via the operation unit I/F 2006.

The VRAM 2009 is a memory for storing the display screen data generated by the CPU 2001. THE CPU 2001 generates the display data acquired from the HDD 2004 into a screen to be displayed on the display-operation unit 2012. The VRAM 2009 stores the image data laid out to be displayed on the display-operation unit 2012.

A network I/F 2010 connects to the LAN 2011 and inputs and outputs information. A modem 2050 connects to a public line 2051 and inputs and outputs information. The image processing apparatus 200 connects to the LAN 2011 and a wide area network (WAN) 2051 via the network I/F 2010 to input from and output to the external devices, the image information and device information. The above-described devices are disposed on the system bus 2007.

An image bus I/F 2005 is a bus bridge that connects the system bus 2007 to an image bus 2008 that transfers the image data at high speed and performs conversion of data structures.

The image bus 2008 is configured by a protocol control information (PCI) bus or an Institute of Electrical and Electronics Engineers (IEEE) 1394. The devices to be described below are disposed on the image bus 2008.

A raster image processor (RIP) 2060 rasterizes a page description language (PDL) code to a bit map image.

A device I/F 2020 connects to the controller unit 2000, the scanner unit 2070 and the printer unit 2095, i.e., the image input/output devices of each device in the apparatus, identifies the status of each device, and performs synchronous/asynchronous conversion of the image data. Further, the device I/F 2020 connects to the sheet feed unit 2100 that feeds the sheets, and the sheet discharge unit 2110 that discharges the printed sheets. The device I/F 2020 thus identifies and detects the status of feeding and discharging of the sheets, error information of the connected devices, and remaining amounts of consumables.

A scanner image processing unit 2080 corrects, processes, and edits the input image data. A printer image processing unit 2090 corrects the printer and performs resolution conversion with respect to the print output image data.

An image rotation unit 2030 rotates the image data. An image compression unit 2040 performs the following compression and decompression: joint photographic experts group (JPEG) compression and decompression of multi-value image data, joint bi-level image experts group (JBIG) compression and decompression of binarized image data, modified modified relative element address designate (MMR) compression and decompression, and modified huffman (MH) compression and decompression.

Various software modules which are recorded in the ROM 2003 or the HDD 2004 in the image processing apparatus, loaded as appropriate to the RAM 2002, and executed by the CPU 2001 according to the present exemplary embodiment will be described below with reference to a block diagram illustrated in FIG. 4.

Figure 4:
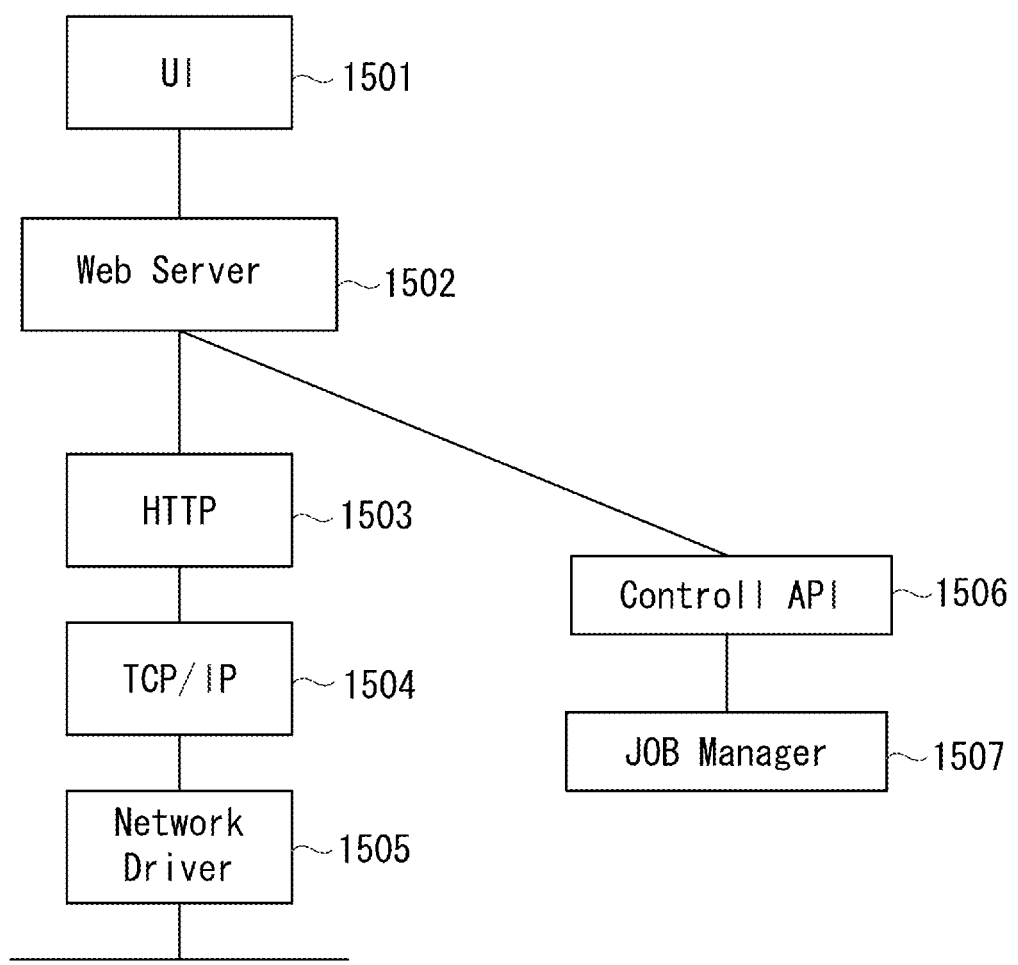
FIG. 4 illustrates a configuration of software modules in the image processing apparatus according to an exemplary embodiment of the present invention.

Referring to FIG. 4, a UI 1501 is a module that acts as an intermediary for the devices when an operator performs various operations and settings with respect to the image processing apparatus using the display-operation unit 2012 in the image processing apparatus. The UI 1501 transfers the input information to the various modules to be described below via the operation unit I/F 2006, and requests processes to be performed, or sets the data, according to the operation of the operator.

A web server module 1502 is used for generating the display data that allows the information to be displayed to a web client according to a request from the web client connected to the LAN 2011. Further, the web server module 1502 is used for notifying of management information to be employed in performing various types of image processing, and of information about the image processing apparatus such as the job status. The image processing apparatus is notified of the request from the web client via the network I/F 2010. On the other hand, the management information of the image processing apparatus is read via a control application programming interface (API) 1506. The management information is then notified via a hypertext transfer protocol (HTTP) module 1503, a transmission control protocol/Internet protocol (TCP/IP) module 1504, and a network driver 1505, to the web client connected to the image processing apparatus via the network I/F 2010.

The web server module 1502 generates information such as an object including images, and text, as the display data that can be displayed by the web client. For example, the web server module 1502 creates web page format of a hypertext markup language (HTML) format as the display data, using the CGI program to be described below. The image processing apparatus thus operates, using the web server module 1502, as the information transmission apparatus that can transmit and provide information to the information processing apparatus, i.e., a client.

The HTTP module 1503 is used when the present multifunction image processing apparatus communicates using the HTTP. The HTTP module 1503 provides the communication function to the web server module 1502 using the TCP/IP module 1504 to be described below.

The TCP/IP communication module 1504 provides a network communication function to the various modules using a network driver 1505. The network driver 1505 controls the network I/F 2010 physically connected to the network.

The control API 1506 provides to the higher level modules, an interface with the lower level modules.

A job manager 1507 interprets the processes instructed from the various modules via the control API 1506, and issues the instruction to each module. Further, the job manager 1507 functions as a job control unit which collectively manages hardware processing performed in the multifunctional image processing apparatus. In such a case, the job manager 1507 can control as necessary, reception and transmission of the information between the various processing units via the image bus I/F 2005.

The operation of the above-described image processing apparatus 200 will be described below with reference to drawings. In particular, the remote UI which is a characteristic function of the image processing apparatus according to the present exemplary embodiment will be described below.

The remote UI is a function for providing a user interface used for acquiring and setting the information such as the status of the apparatus, and for causing operations such as printing and transmission (i.e., Universal-Send) to be performed from the external device. The remote UI may thus be defined as the display screen that is displayed on the external device. The user can use the functions of the remote UI by accessing the image processing apparatus using the web browser in the computer connected to the network.

As illustrated in FIG. 4, the web server module 1502 operates inside the image processing apparatus, so that HTTP communication can be performed. The web server module 1502 can execute the CGI program activated according to the request from the client.

The HDD 2004 illustrated in FIG. 2 stores a resource file group and a template file group of a page that are used in the remote UI. The resource file is an HTML file or an image file used in displaying the page. The resource file is not limited to the HTML file, and may also be the display data that expresses the screen indicating the information about the resource, and may be a file written in other languages. Further, the template file is a file referred to from the CGI program and used for generating the page.

The user directly inputs a uniform resource locator (URL) to the web browser or selects a link in which the URL is embedded to access the image processing apparatus. The web browser then transmits via the network, the HTTP command designating the URL input by the user.

The web server module 1502 receives and analyzes the HTTP command, and performs an operation according to the analyzed HTTP command. For example, the web server 1502 instructs the main body to set, acquire, or print the information of the image processing apparatus according to the request of the HTTP command. Further, the web server module 1502 generates the web page according to the request using the template file, and transmits the generated web page to the web browser in the client.

The web browser then displays the web page returned from the image processing apparatus. As a result, the user operating the computer can acquire and set the functions, status, and stored information about the image processing apparatus by using the web browser to access the apparatus. Further, the user can operate the image processing apparatus. Furthermore, since the display data of the remote UI is provided in the HTML data, the computer does not require dedicated software for displaying the remote UI, and only general software such as the web browser becomes necessary.

The basic operation of the remote UI will be described below with reference to FIG. 5.

Figure 5:
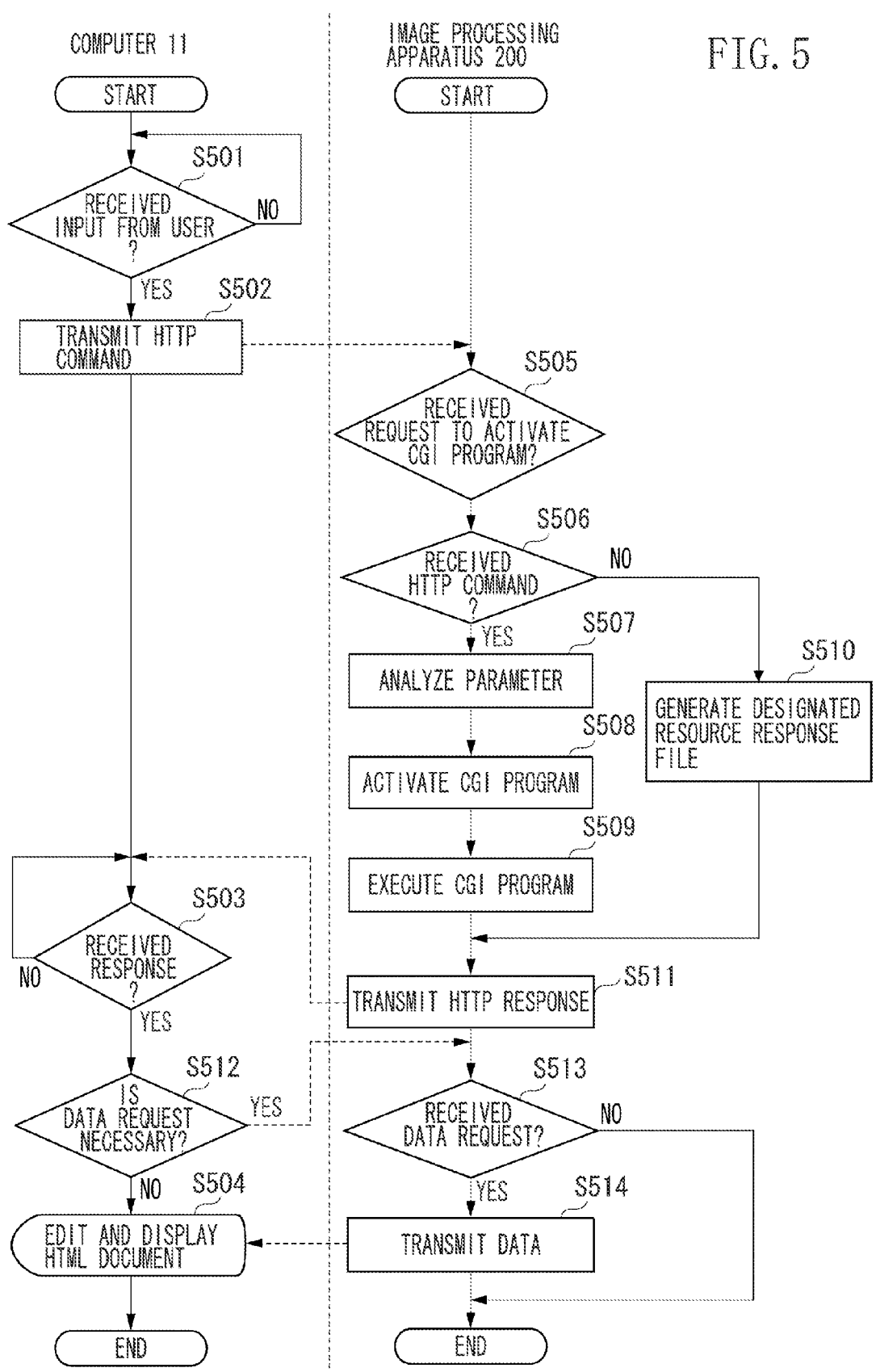
FIG. 5 is a flowchart illustrating an example of a data processing procedure performed by a computer and the image processing apparatus according to an exemplary embodiment of the present invention.

FIG. 5 is a flowchart illustrating an example of a data processing procedure performed by the computer 11, i.e., the web client (browser), and the image processing apparatus 200, i.e., the web server, according to the present invention.

Referring to FIG. 5, the processes illustrated in step S501 to step S504, and step S512 are performed by the computer 11, and the processes illustrated in step S505 to step S511, step S513, and step S514 are performed by the image processing apparatus 200. Further, broken line arrows illustrated in FIG. 5 indicate transmission and reception of information. Each of the steps illustrated in FIG. 5 is performed by the CPU in the computer 11 or the image processing apparatus 200 expanding in the RAM and executing the program stored in the memory such as the ROM.

The processes performed by the computer 11 will be described below. The flow of the processes performed by the computer 11 starts when the web browser receives the user input. In step S501, the computer 11 stands by for the user to input the URL. If the user inputs the URL (YES in step S501), the process proceeds to step S502. In step S502, the computer 11 executing the web browser transmits to the image processing apparatus 200 via a communication path such as the LAN 2011, the HTTP command designating the input URL. The HTTP command is a command for requesting the HTML data corresponding to the input URL. The command also includes a command designating the display language. If the user has not input the URL (NO in step S501), the computer 11 stands by to receive the user input.

In step S503, the computer 11 stands by to receive an HTTP response as a reply from the image processing apparatus 200. The HTTP response includes the HTML data corresponding to the URL designated by the HTTP command in step S502. If the computer 11 receives the HTTP response (YES in step S503), the process proceeds to step S512. In step S512, the web browser analyzes the HTML data included in the HTTP response, and determines whether there is a link to the image data to determine whether it is necessary to request for data when editing and displaying an HTML document. If the web browser determines that it is necessary to request for the data when editing and displaying the HTML document (YES in step S512), the web browser requests the image processing apparatus 200 for the image data. If the necessary data is then acquired, the process proceeds to step S504. In step S504, the web browser edits and displays the HTML document. One session thus ends. If there is no link to the image data, and it is not necessary to request for the data when editing and displaying the received HTML document (NO in step S512), the process then performed in step S512 is omitted, and the process proceeds to step S504.

The image processing apparatus 200 stands by until the HTTP command is received from the computer 11. In step S505, the CPU 2001 in the image processing apparatus 200 determines whether the HTTP command is received via the network I/F 2010. If the CPU 2001 determines that the HTTP command is received (YES in step S505), the process proceeds to step S506.

In step S506, the CPU 2001 determines whether the request from the web browser is a request to activate the CGI program. If the request is to activate the CGI program (YES in step S506), the process proceeds to step S507. In step S507, the CPU 2001 analyzes CGI parameters and determines the CGI program to be performed. The CPU 2001 then stores the parameter in the RAM 2002. In step S508, the CPU 2001 activates the determined CGI program.

In step S509, the CPU 2001 performs the CGI program. In step S511, the CPU 2001 transmits to the computer 11 as the HTTP response, the result acquired in step S509. The HTTP response includes the HTML data generated by performing the CGI program to be described below.

In step S513, the CPU 2001 determines whether there is a request for the data from the computer 11 via the network I/F 2010. If the CPU 2001 determines that there is such a request (YES in step S513), the process proceeds to step S514. In step S514, the CPU 2001 transmits the requested data, and one session ends. If the CPU 2001 determines that there is no request for the data from the computer 11 (NO in step S513), the session ends. The processes for receiving the data request in step S513 and transmitting the data in step S514 may be performed a plurality of times.

The CGI program activated in step S508 requests to the image processing apparatus (i.e., the job manager 1507) to acquire and set the apparatus information, or perform printing, according to the request from the computer 11. Further, the CGI program generates the HTML page to be transmitted, using the template file corresponding to the page. The template file includes a portion in which a description of the HTML to be generated is changed using the acquired apparatus information. As a result, the page content can be dynamically generated according to the current status of the image processing apparatus 200. The image generation instruction that is necessary for generating the page content is also issued when the CGI program is executed.

On the other hand, if the request is not a request for activating the CGI program (NO in step S506), the process proceeds to step S510. In step S510, the CPU 2001 returns the designated resource file as the response, and the session ends.

The process procedure performed by the CGI program in step S509 illustrated in FIG. 5 according to the present exemplary embodiment will be described below with reference to the flowchart illustrated in FIG. 6. Each of the steps illustrated in FIG. 6 is performed by the CPU 2001 in the image processing apparatus 200 expanding in the RAM and executing the program stored in the memory such as the ROM.

In step S601, the CPU 2001 receives the parameter analyzed in step S507 illustrated in FIG. 5. In step S602, the CPU 2001 determines whether the parameter request received in step S601 is a request for generating a capture screen of the local UI.

If the parameter request is not a request for generating the capture screen (NO in step S602), the process proceeds to step S604. In step S604, the CPU 2001 performs the process according to the content of the parameter request. According to the present exemplary embodiment, the description of the process will be omitted.

If the parameter request is a request for generating the capture screen (YES in step S602), the process proceeds to step S603. In step S603, the CPU 2001 acquires browser display language type information from the HTTP command received in step S505 illustrated in FIG. 5. In step S605, the CPU 2001 then determines whether the browser display language type matches the language type information of the screen currently displayed on the local UI. More specifically, the CPU 2001 refers to the screen information table illustrated in FIG. 3, and identifies the language type information 10004 of the display screen data currently stored in the VRAM 2009. The CPU 2001 then compares the identified language type information and the browser display language type information acquired from the HTTP command received in step S505 illustrated in FIG. 5. The CPU 2001 thus determines whether the identified language type information matches the browser display language type information acquired from the HTTP command.

If the language types do not match (NO in step S605), the process proceeds to step S606. In step S606, the CPU 2001 determines whether the message resource of the language type that matches the browser display language type is stored in the message resource storing unit 10005. If the matching message resource is stored in the message resource storing unit 10005 (YES in step S606), the process proceeds to step S607. In step S607, the CPU 2001 acquires from the message resource storing unit 10005, the message resource corresponding to the browser display language type as a designated language type.

In step S608, the CPU 2001 changes the message resource portion of the display image data currently stored in the VRAM 2009 to the message resource acquired in step S607. The CPU 2001 then expands and stores in the VRAM the display image data in which the message resource portion is changed. In step S609, the CPU 2001 performs capture processing on the display image data stored in the VRAM in step S608. The VRAM according to the present exemplary embodiment includes a region for expanding the screen data to be captured for the remote UI, in addition to the screen data to be actually displayed on the local UI. The capture screen data is expanded in the region for expanding the capture screen data in the VRAM, and the screen data expanded in such a region is not displayed on the local UI. According to the present exemplary embodiment, such screen data is expanded in the VRAM. However, the screen data may be expanded and stored in other memories (e.g., the HDD and the ROM).

On the other hand, if the browser display language type matches the language type information of the screen that is currently displayed on the local UI (YES in step S605), the process proceeds to step S609. Further, if the message resource of the language type matching the browser display language type is not stored in the message resource storing unit 10005 (NO in step S606), the process proceeds to step S609. In step S609, the CPU 2001 performs capture processing on the display screen data stored in the VRAM.

In step S610, the CPU 2001 generates a bit map image of the display screen data acquired by performing capturing processing, and generates the web page including the bit map image. More specifically, the CPU 2001 generates the HTML data including the link to the generated bit map image.

The process of the CGI program performed in step S509 illustrated in FIG. 5 is as described above.

Figure 7:
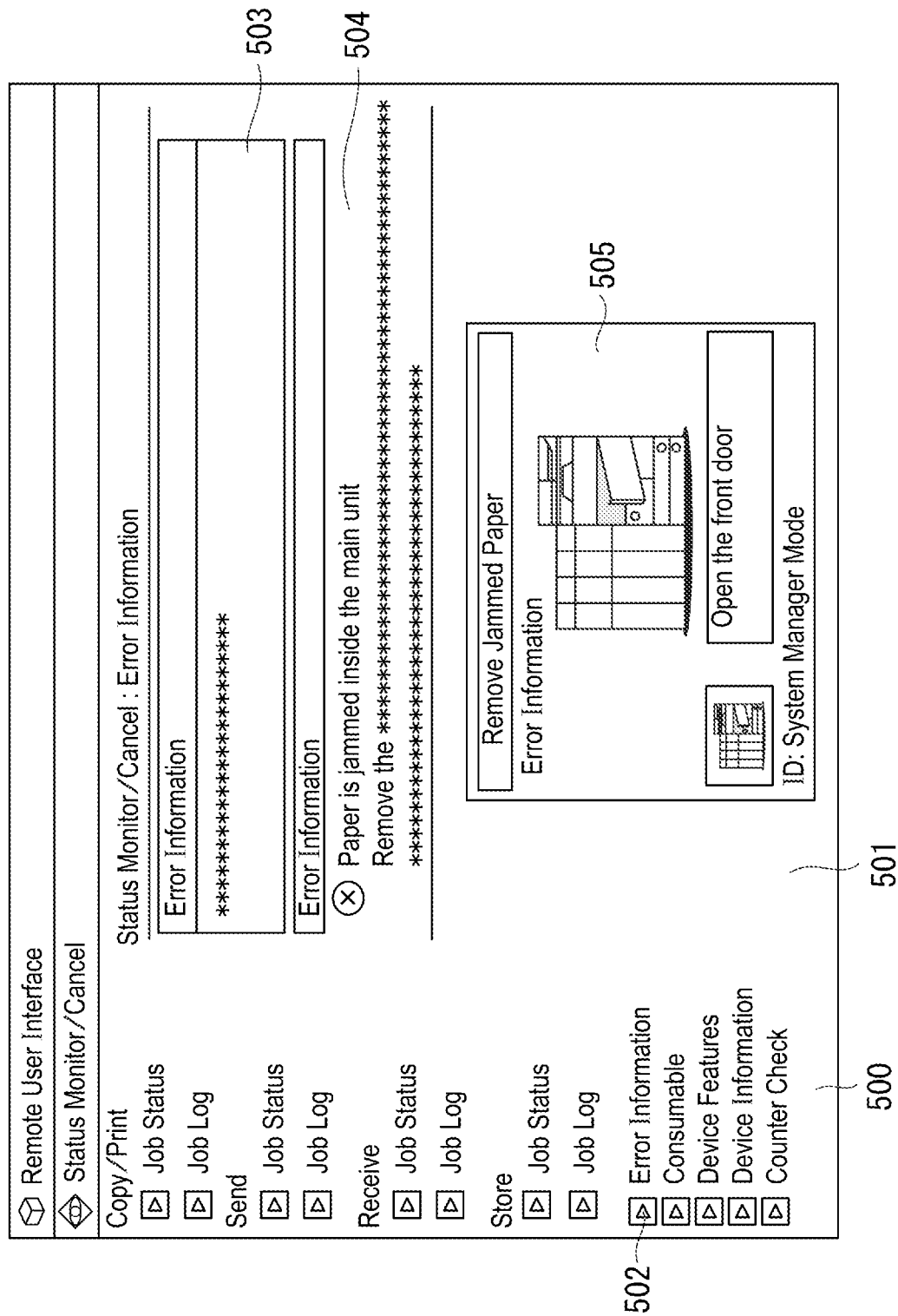
FIG. 7 illustrates a display example on a web browser of a web page transmitted from the image processing apparatus according to an exemplary embodiment of the present invention.

FIG. 7 illustrates an example of the web page transmitted from the image processing apparatus 200 and displayed on the web browser according to the present exemplary embodiment. The screen is displayed by the web browser on the display unit of the computer 11.

FIG. 7 illustrates an example in which the screen that is in common with the screen displayed on the local UI of the image processing apparatus when an error occurs in the image processing apparatus, is displayed on the remote UI.

Referring to FIG. 7, the user presses (i.e., clicks) an "error information" button 502 in an index area 500 in a top page of the remote UI. The HTTP command for displaying the error information page is then transmitted to the image processing apparatus 200 (i.e., corresponding to step S502 illustrated in FIG. 5). In such a case, the information about the display language type of the web page is described in the HTTP command to be transmitted. The example illustrated in FIG. 7 describes the information indicating that the display language type is English. Upon receiving the HTTP command, the image processing apparatus 200 performs the process to satisfy the request, and transmits the HTML data describing the display content illustrated in FIG. 7 (i.e., corresponding to step S511 illustrated in FIG. 5). A main area 501 in the remote UI screen includes error information 503, detailed error information 504, and a capture screen 505. Since the display language type of the web browser is English in the example illustrated in FIG. 7, the capture screen 505 of the image processing apparatus operation unit 2012 displayed on the web browser is also displayed in English.

As described above, according to the present exemplary embodiment, the process of step S608 illustrated in FIG. 6 replaces the message resource portion of the display image data of the local UI with the message resource corresponding to the display language type of the web browser. As a result, the display language type of the capture screen in the local UI of the image processing apparatus 200 can be matched to the display language type of the remote UI.

According to the present exemplary embodiment, the user can view the display screen of the image processing apparatus on the computer used by the user by matching the display language types of the web page to be displayed on the web browser in the computer with the display screen of the image processing apparatus. A display that is more easily understandable for the user can be realized.

In general, the image processing apparatus on the network is shared by various users, and the display screen is usually displayed in the display language type determined by an administrator. On the other hand, the computer which is personally used by the user is set to display in the display language type that is easily understandable by the user, and the web page displayed on the web browser included in the computer is similarly set. In other words, according to the present exemplary embodiment, the user can be provided with the web page that is easy to use, even when the display language type of the display screen in the image processing apparatus is different from the display language type of the web page displayed on the computer in such a state.

According to the above-described exemplary embodiment, the present invention is applied to an image processing apparatus that can operate as the information transmission apparatus. However, this is not a limitation. Further, the present invention may be applied to a system configured by a plurality of apparatuses. For example, a plurality of CPUs included in one apparatus can cooperatively perform the process of each flowchart illustrated in the above-described exemplary embodiment, or the CPU included in each of the plurality of apparatuses can cooperatively perform the process. Furthermore, according to the above-described exemplary embodiment, the web page provided by the information transmission apparatus is described using the HTML data. However, the web page may also be described using other page description languages such as extensible markup language (XML).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-131256 filed Jun. 8, 2010, which is hereby incorporated by reference herein in its entirety.

What is claimed is:

1. An image processing apparatus comprising:
a receiving unit configured to receive from an information processing apparatus, a request for a web page;
an identification unit configured to identify a display language type of a web page to be displayed on a web browser included in the information processing apparatus based on the request received by the receiving unit;
a storing unit configured to store a plurality of display language types settable for displaying an operation panel included in the image processing apparatus and a message resource of each of the plurality of display language types;
a determination unit configured to determine whether a display language type set for displaying the operation panel matches the display language type identified by the identification unit;
a first generation unit configured to, based on that the determination unit determines that the display language type set for displaying the operation panel matches the display language type identified by the identification unit, generate a first image indicating a first display screen displayed on the operation panel;
a second generation unit configured to, based on that the determination unit determines that the display language type set for displaying the operation panel does not match the display language type identified by the identification unit, obtain a message resource of a display language type matching the display language type identified by the identification unit from among a plurality of message resources stored by the management unit and generate a second image indicating a second display screen in which a message resource of the first display screen is replaced with the obtained message resource; and
a transmission unit configured to transmit to the information processing apparatus a web page associated with one of the first image generated by the first generation unit and the second image generated by the second generation unit.

2. The image processing apparatus according to claim 1, wherein the receiving unit receives information included in an HTTP command transmitted from the information processing apparatus.

3. The image processing apparatus according to claim 1, further comprising a capturing unit configured to generate a capture image of the first display screen or the second display screen, wherein the transmission unit transmits a web page including, the capture image generated by the capturing unit.

4. The image processing apparatus according to claim 1, wherein the transmission unit transmits HTML data including a link to one of the first image and the second image.

5. The image processing apparatus according to claim 1, wherein a web page transmitted by the transmission unit is a web page for specifying settings related to image processing performed in the image processing apparatus.

6. A control method of an image processing apparatus comprising:
receiving from an information processing apparatus, a request for a web page;
identifying a display language type of a web page to be displayed on a web browser included in the information processing apparatus;
storing a plurality of display language types settable for displaying an operation panel included in the image processing apparatus and a message resource of each of the plurality of display language types;
determining whether a display language type of a screen set for displaying the operation panel matches the display language type identified by the identification unit;
generating, based on a determination that the display language type set for displaying the operation panel matches the display type language type that has been identified, a first image indicating a first display screen of the operation panel;
generating, based on a determination that the display language type set for displaying the operation panel does not match the display language type that has been identified, and obtaining a message resource of a display language type matching the display language type identified by the identification unit from among the plurality of message resources that have been stored and generating a second image indicating a second display screen in which a message resource of the first display screen is replaced with the obtained message resource; and transmitting the generated web page associated with one of the first image and the second image to the information processing apparatus.

7. A non-transitory computer-readable storage medium storing a program for causing an image processing apparatus to perform each step according to claim 6.

* * * * *